Oct. 13, 1936.  C. GEORGE  2,057,332
MACHINE FOR DUSTING PLANTS WITH AN INSECTICIDE
Filed Oct. 23, 1935  2 Sheets-Sheet 1
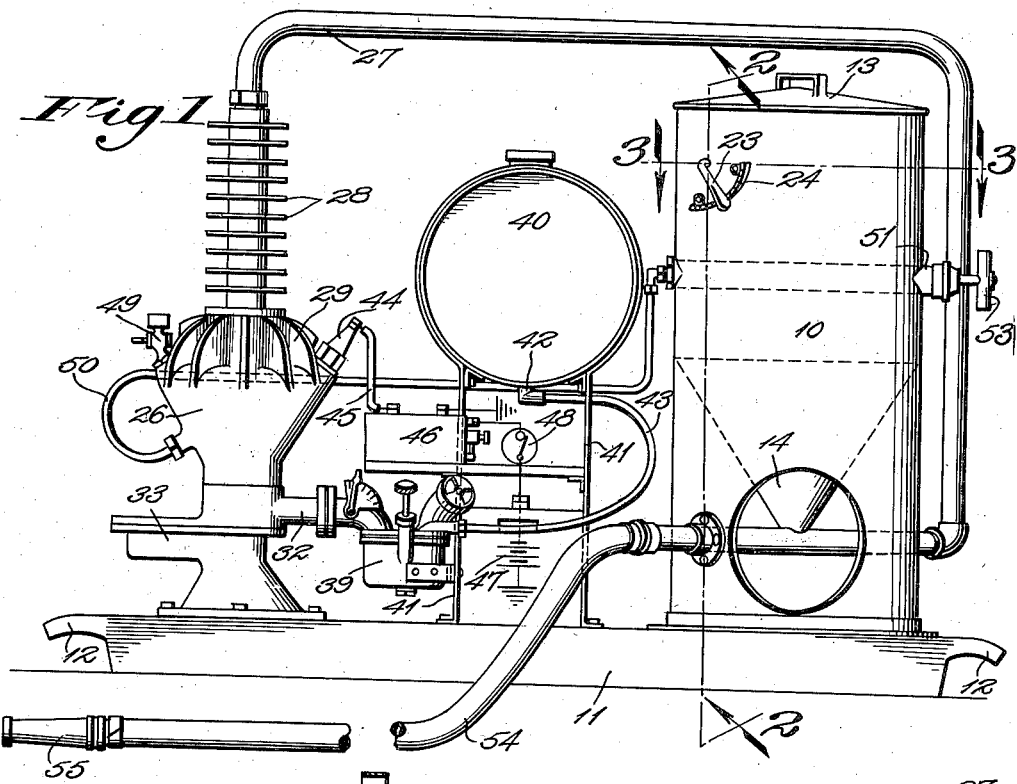
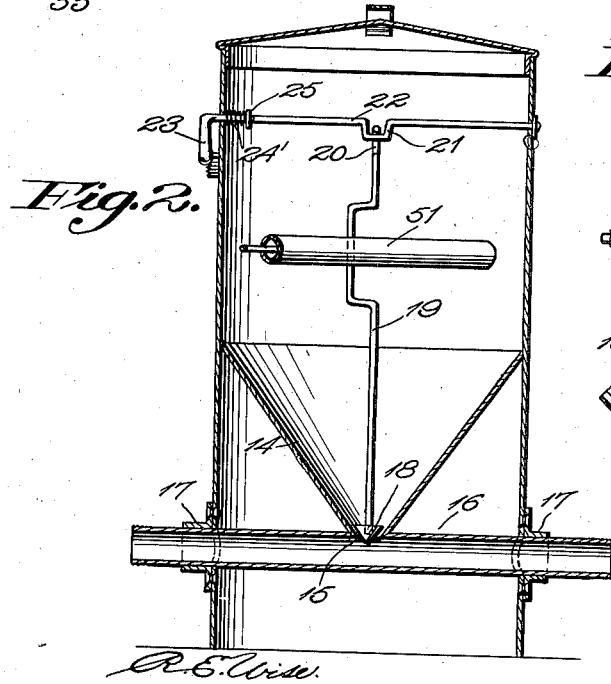
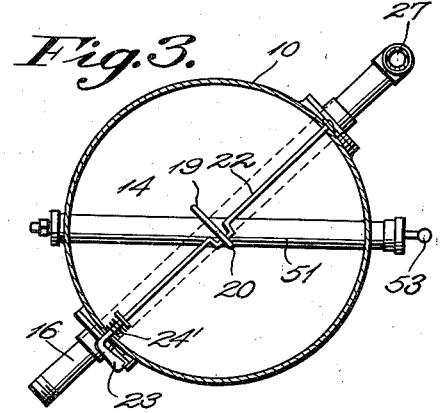
Coy George
INVENTOR
BY Victor J. Evans & Co.
ATTORNEY

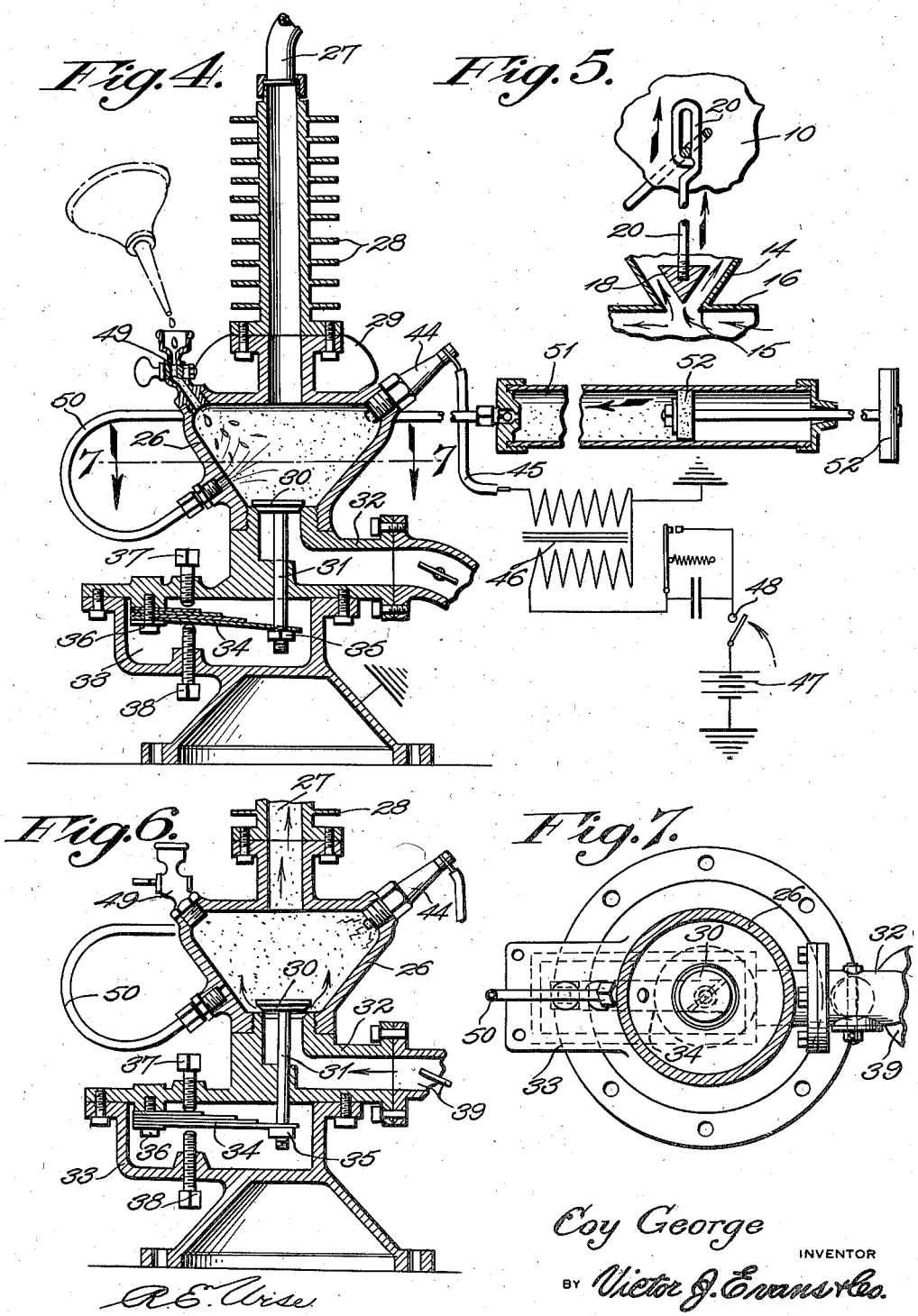

Patented Oct. 13, 1936

2,057,332

UNITED STATES PATENT OFFICE 2,057,332

MACHINE FOR DUSTING PLANTS WITH AN INSECTICIDE

Coy George, Highlandale, Miss.

Application October 23, 1935, Serial No. 46,411

3 Claims. (Cl. 43—148)

This invention relates to machines for dusting plants with an insecticide in powder form and has for an object to provide a powder tank having an outlet port communicating with a discharge tube and controlled by a novel flutter valve which may be manually set to discharge a predetermined amount of insecticide per hour.

A further object is to provide a combustion chamber in full communication with the discharge tube and operating to move the valve upwardly from its closed position by pressure waves produced intermittently in the discharge tube, this movement of the valve and the vacuum created in the discharge tube immediately after each pressure wave effecting a more uniform feeding of the powder to the discharge tube than hitherto possible.

A further object is to provide ignition and vaporizing means for intermittently igniting fuel whereby to permit the exhaust gases to produce the pressure waves in the discharge tube and whereby to permit the exhaust gases to pick up the powder in the discharge tube and reciprocate it several times within the tube before forcing it through the nozzle of the tube, the result being that the powder is discharged from the discharge tube in finely comminuted form.

With the above and other objects in view the invention consists of certain novel details of construction and combination of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of plant dusting apparatus constructed in accordance with the invention.

Figure 2 is a vertical sectional view through the powder tank taken on the line 2—2 of Figure 1.

Figure 3 is a cross sectional view through the powder tank taken on the line 3—3 of Figure 1.

Figure 4 is an enlarged longitudinal sectional view through the combustion chamber showing the method of initially priming the combustion chamber.

Figure 5 is a detail sectional view showing the powder outlet valve.

Figure 6 is a vertical sectional view through the combustion chamber showing the parts in position for continuous operation, and Figure 7 is a cross sectional view through the combustion chamber taken on the line 7—7 of Figure 4.

Referring now to the drawings in which like characters of reference designate similar parts in the various views, 10 designates a storage tank for an insecticide in powder form, the tank having a cylindrical side wall which is supported preferably upon longitudinal sills 11 equipped with grips 12 for applying the apparatus to a truck or other vehicle for moving the apparatus along the rows of plants to be treated with the insecticide. The tank is closed at the top by a cover 13 and is provided with a funnel shaped bottom 14 having a port 15 at the lowest point communicating with a discharge pipe 16 which is secured in a horizontal position at the lower end of the cylindrical side wall by means of flanged collars 17.

The port 15 is controlled by a conical outlet valve 18 which is equipped with a stem 19 having the upper end provided with an elongated eye 20 which receives a U-shaped crank 21 carried by a shaft 22 which is journaled at the ends in the cylindrical side wall of the tank and exteriorly of the tank is equipped with a handle 23. A notched segment 24 is disposed on the tank underneath the handle and the handle is held selectively engaged with the notches by means of a spring 24' which surrounds the shaft 22 and is confined under tension between the collar 25 on the shaft and the cylindrical side wall of the tank. The handle may be set at any predetermined position to limit fluttering movement of the valve 18 to discharge a predetermined amount of insecticide per hour as will later be described.

A combustion chamber 26 in the nature of a closed pot is provided in the top with an exhaust pipe 27 which is provided near the combustion chamber with cooling pins 28 and the top of the combustion chamber is also provided with cooling pins 29. The exhaust pipe is connected to one end of the discharge pipe 16 and is in full communication with the discharge pipe so that the exhaust gases have unobstructed passage through the discharge pipe to pick up powder discharged through the outlet 15.

The combustion chamber is provided in the bottom with a fuel control valve 30, the stem 31 of which is slidably mounted in the fuel supply pipe 32 below the combustion chamber and projects below the pipe into a housing 33 wherein is mounted a leaf spring 34, one end of which bears upon a nut 35 carried by the valve stem and the opposite end of which is fixed to the top of the casing by a screw bolt 36 or other connector. Set screws 37 and 38 are threaded through the top and through the bottom of the housing respectively and provide means for regulating the play of the spring. The spring normally exerts a downward pressure upon the nut 35 to hold the valve 30 closed. After each explosion the vacuum created behind the pressure wave of burned fuel gases lifts the valve against the pressure of the spring to admit a charge of fresh fuel, as best shown in Figure 6.

The fuel pipe 32 is operatively connected to a conventional carbureter 39 for vaporizing the fuel, and the fuel supply tank 40 is supported upon the sills 11 by suitable uprights 41 and has the outlet 42 in the bottom connected by a pipe 43 to the carbureter.

A spark plug 44 is mounted in the top of the combustion chamber and is connected by a wire 45 to a high tension coil and interrupter 46. A storage battery 47 is operatively connected to the coil and the current supply is controlled by a switch 48 of any preferred type.

For priming the combustion chamber, a priming valve 49 is mounted in the top of the combustion chamber opposite the spark plug and permits of the priming fuel such as gasoline being admitted to the combustion chamber where it accumulates on the bottom of the chamber above the valve 30. An air pipe 50 is connected to the combustion chamber above the valve 30 and is connected at the opposite end to an air pump casing 51 which is disposed horizontally in the powder tank 10 and is provided with a plunger 52, the stem of which extends exteriorly of the tank and is equipped with a grip 53 which may be manipulated to compress air in the pump cylinder and force it into the combustion chamber for vaporizing the priming charge. The spark plug may now be energized by closing the switch 48 to fire the charge, and as above stated the vacuum created behind the pressure wave of the burned gases will automatically open the fuel valve 30 to permit a vaporized charge of fuel from the carbureter entering the combustion chamber to be fired, this action then being continuous to produce intermittent pressure waves and intervening low pressure or vacuum areas between the waves in the exhaust pipe 27 and discharge pipe 16.

The powder control valve 18 is moved upwardly from closed position by the pressure waves produced intermittently in the discharge tube 16. The pressure of the powder on top of the valve will close the valve immediately after each pressure wave. Since the pressure of powder on the valve decreases as the level of the powder supply in the tank moves downward, the pressure of the exhaust gases in the discharge pipe 16 will open the valve wider. Thus a uniform feeding of the powder to the discharge tube will be effected at all times to produce a predetermined discharge per hour and promote a uniform distribution of the insecticide on the plants to be treated.

The discharge pipe 16 is provided with an outlet pipe 54 which terminates in a nozzle 55 for directing the powder upon the plants.

It will be observed that the turbulence set up in the exhaust gases passing through the discharge pipe 16 produces a reciprocating motion to cause the powder particles to surge back and forth in the discharge pipe several times before being blown from the nozzle 55. The result of this agitation of the powder is that the powder is divided into finely comminuted form before emerging from the nozzle. Furthermore the weight of the powder as it mixes with the exhaust gases adds weight to the reciprocating mass which creates a back pressure on the combustion chamber and in practice causes the combustion chamber to operate with minimum fuel consumption.

From the above description it is thought that the construction and operation of the invention will be fully understood without further explanation.

What is claimed is:

1. A machine of the class described comprising an insecticide tank having an outlet port, a discharge pipe communicating with the port, a valve controlling the port, a stem for the valve terminating in an elongated eye, a shaft having a crank engaging said eye, the ends of the shaft being journaled in the wall of the tank, a handle for the shaft disposed exteriorly of the tank, a notched segment operatively engaging the handle, a spring operatively connected with the shaft for holding the handle selectively engaged in the notches of the segment, an internal combustion chamber, and an exhaust pipe for the chamber operatively connected to the discharge pipe, the exhaust gases producing intermittent pressure waves in the discharge pipe to produce fluttering movement in the valve limited by contact of the ends of the eye with the crank to promote uniform feeding of the insecticide from the tank to the discharge pipe.

2. A machine of the class described comprising an insecticide tank having an outlet port, a discharge pipe communicating with the port, a valve controlling the port, an internal combustion chamber, means for intermittently firing a combustible charge in said chamber, an exhaust pipe communicating with one end of the chamber, a valve controlled fuel inlet pipe communicating with the opposite end of the chamber, said exhaust pipe being terminally connected to one end of the discharge pipe for directing the exhaust gases through the pipe and against the valve, and a nozzle operatively connected with the discharge pipe, the exhaust gases producing intermittent pressure waves in the discharge pipe to effect fluttering movement of the valve for feeding the insecticide into the discharge pipe and to reciprocate the powder laden exhaust gases within the pipe between the nozzle and the valve before the gases escape from the nozzle.

3. A machine of the class described comprising an insecticide tank having an outlet port, a discharge pipe communicating with the port, a valve controlling the port, an internal combustion chamber, an exhaust pipe for the chamber communicating with the discharge pipe, intermittent pressure waves of exhaust gases operating the valve and reciprocating the insecticide discharged by the valve before escape from the discharge pipe, a manually operable air pump for supplying an initial charge of compressed air to the combustion chamber for vaporizing a priming charge of fuel in the combustion chamber, a normally closed fuel inlet valve in the combustion chamber, a carbureter operatively connected to the combustion chamber, and means for firing a combustible charge in the chamber.

COY GEORGE.